(12) United States Patent
Jalluri et al.

(10) Patent No.: US 10,378,874 B2
(45) Date of Patent: Aug. 13, 2019

(54) SYSTEM AND METHOD FOR CHARACTERIZING SURFACES USING SIZE DATA

(71) Applicant: FORD GLOBAL TECHNOLOGIES, LLC, Dearborn, MI (US)

(72) Inventors: Chandra Sekhar Jalluri, Canton, MI (US); Youssef A. Hamidieh, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 14/903,212

(22) PCT Filed: Jul. 7, 2014

(86) PCT No.: PCT/US2014/045551
§ 371 (c)(1),
(2) Date: Jan. 6, 2016

(87) PCT Pub. No.: WO2015/006198
PCT Pub. Date: Jan. 15, 2015

(65) Prior Publication Data
US 2016/0202036 A1    Jul. 14, 2016

Related U.S. Application Data

(60) Provisional application No. 61/844,169, filed on Jul. 9, 2013.

(51) Int. Cl.
*G01B 7/12* (2006.01)
*G01B 5/08* (2006.01)
*G01B 5/00* (2006.01)

(52) U.S. Cl.
CPC ............. *G01B 7/12* (2013.01); *G01B 5/003* (2013.01); *G01B 5/08* (2013.01); *G01B 7/125* (2013.01)

(58) Field of Classification Search
CPC ................... G01B 7/12; G01B 5/003
(Continued)

(56) References Cited

U.S. PATENT DOCUMENTS 5,301,545 A    4/1994  Meyer et al.
5,740,616 A    4/1998  Seddon et al.
(Continued)

FOREIGN PATENT DOCUMENTS

CN    1093479 A    10/1994
EP    1043564 A2   10/2000
(Continued)

OTHER PUBLICATIONS

European Search Report for Application No. EP 14 82 3579 dated Jan. 26, 2017.
(Continued)

*Primary Examiner* — Marc Anthony Armand
(74) *Attorney, Agent, or Firm* — Raymond L. Coppiellie; Brooks Kushman P.C.

(57) ABSTRACT

A system and method for characterizing surfaces includes using a measuring device to take size measurements of a manufactured product. The raw measurement data is transformed from a time-based domain to a frequency-based domain using a mathematical algorithm. The transformed size measurement data is then compared to predetermined limits within comparable frequency bands to characterize the surface of the manufactured product.

20 Claims, 8 Drawing Sheets

(58) Field of Classification Search
USPC .......................................................... 702/157
See application file for complete search history.

(56) References Cited

U.S. PATENT DOCUMENTS

| | | | |
|---|---|---|---|
| 6,014,652 A * | 1/2000 | Hill | G01B 5/28 |
| | | | 706/15 |
| 6,931,749 B2 | 8/2005 | Dall'Aglio | |
| 7,047,658 B2 | 5/2006 | Danielli et al. | |
| 8,302,321 B2 * | 11/2012 | Hunter | G01B 21/04 |
| | | | 33/503 |
| 2002/0020075 A1 | 2/2002 | Dall'Aglio et al. | |
| 2006/0249675 A1 | 11/2006 | Taniuchi et al. | |
| 2008/0266574 A1 * | 10/2008 | Groot | G01B 11/0675 |
| | | | 356/511 |
| 2011/0239478 A1 * | 10/2011 | Dall'Aglio | B24B 49/04 |
| | | | 33/555.3 |
| 2012/0053854 A1 | 3/2012 | Huffman et al. | |

FOREIGN PATENT DOCUMENTS

| | | |
|---|---|---|
| JP | H09171007 A | 6/1997 |
| JP | 2008290203 A | 12/2008 |
| WO | 2012112898 A1 | 8/2012 |

OTHER PUBLICATIONS

Chinese Search Report for App. No. 201480039532.4 dated Dec. 5, 2017.

\* cited by examiner

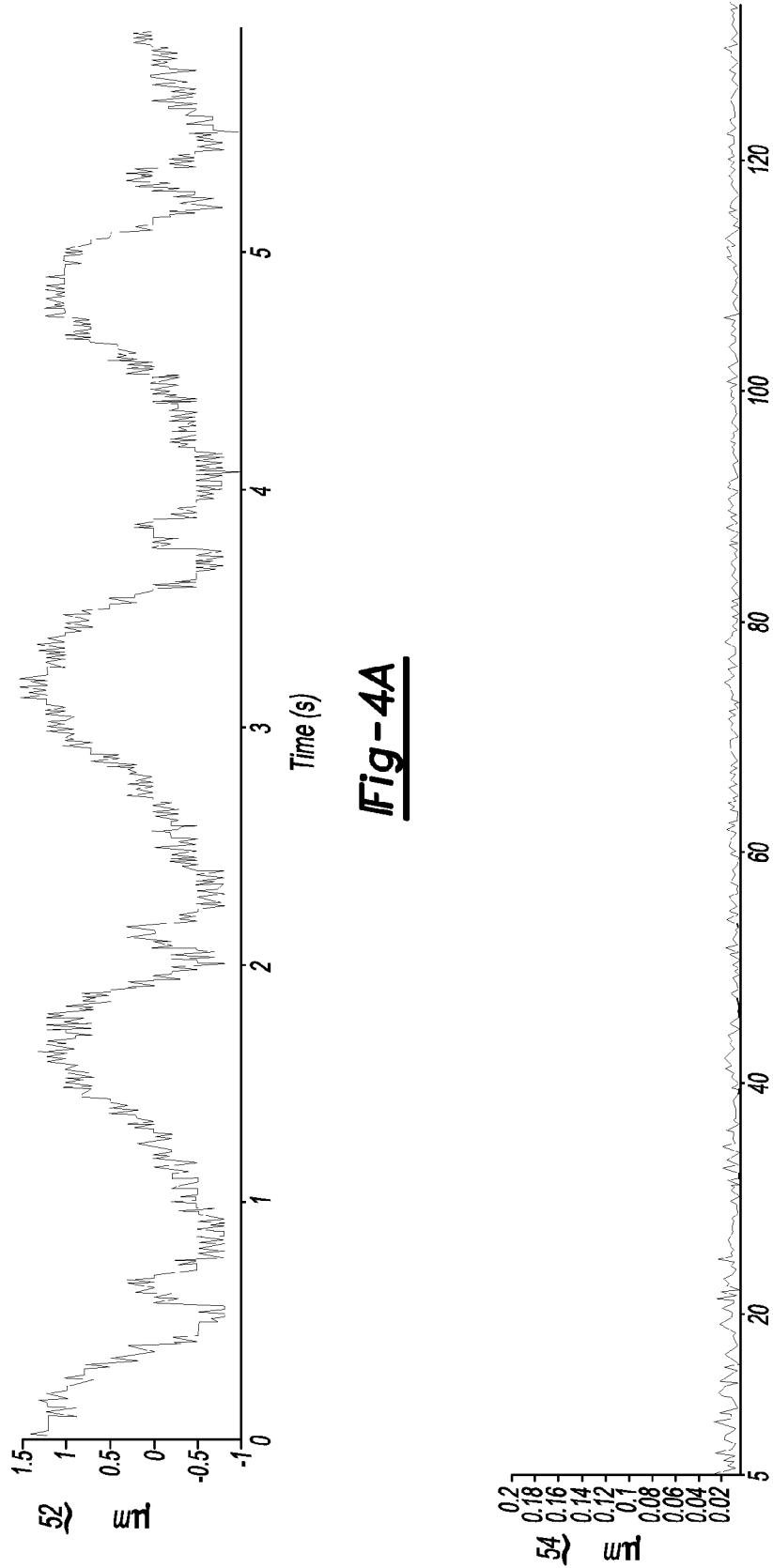

SYSTEM AND METHOD FOR CHARACTERIZING SURFACES USING SIZE DATA

CROSS-REFERENCE TO RELATED APPLICATIONS

This application claims the benefit of U.S. provisional application No. 61/844,169 filed 9 Jul. 2013, which is hereby incorporated herein by reference.

TECHNICAL FIELD

The present invention relates to a system and method for characterizing surfaces using size data.

BACKGROUND

Surface finish gauges having a small probe tip radius and a high data density are frequently used to measure the surface roughness of manufactured products. Very often, the surface finish of a manufactured product, for example, a crankshaft, is measured on an audit basis—i.e., not every part is measured, but rather, only a statistical sample is checked. Products with unacceptable surface finish characteristics may not be detected if there is only an intermittent manufacturing problem. One example of this is found in the case of crankshaft polishers not functioning correctly. Even if a problem is detected during the statistical sampling of surface finish measurements, it may not be detected in time to keep a component from being assembled in an engine or other large assembly. This can create additional downtime and expense as assemblies must be quarantined, and then ultimately disassembled to have the defective components replaced.

In contrast to surface measurements, some types of measurements in high volume production are taken on every product that is manufactured for in-line monitoring. For example, with some manufactured products, such as a crankshaft, every part may have diameter measurements taken at various locations to ensure compliance with specifications. Such measurements for in-line size evaluation are typically performed using much larger probe tips, and have lower data density, when compared to audit surface roughness gauges. The diameter measurement data is typically analyzed and then discarded once it has been determined that the crankshaft meets the required size specifications. Because this data is available for every part—as opposed to a statistically sampled subset of surface roughness data—it would be desirable to use this data to indicate other product parameters, such as a surface finish characterization—e.g., to determine whether the part surface is properly finished.

SUMMARY

At least some embodiments of the present invention include a method for characterizing a surface of a manufactured product by utilizing data collected for size evaluation, which may be, for example, data collected during in-line monitoring in a manufacturing process. The method includes the step of taking a plurality of size measurements, such as the diameter of the manufactured product. The raw data may or may not be processed by, for example, filtering. The raw data or processed raw data may then be referred to as "size measurement data". Where the size being measured is a diameter, this data may be referred to as "diameter measurement data". The diameter measurement data is transformed from its time-based domain to a different domain, such as a frequency domain or a wavelength domain. This may be performed by using, for example, a fast Fourier transform (FFT). At least some of the transformed diameter measurement data is then compared to predetermined limits to characterize a surface of the manufactured product. For example, certain amplitudes of the transformed diameter measurement data can be compared to expected amplitudes of similar data for manufactured products known to have acceptable surface characteristics. If the amplitudes of the transformed diameter measurement data are within the limits associated with parts that are known to be "good", then it may be assumed that the product being manufactured has surface finish characteristics that indicate a proper finish.

At least some embodiments of the present invention include a method for characterizing a surface finish of the manufactured product that includes the step of comparing amplitudes of frequency-based or wavelength-based transformed size data, such as diameter data, for the manufactured product to predetermined amplitude limits to characterize a surface of the manufactured product.

At least some embodiments of the invention may include a method for characterizing surfaces that includes taking size measurements of a feature of a manufactured product over time, using the size measurements to yield size measurement data in a time-based domain, transforming the time-based domain size measurement data to frequency-based domain size measurement data, and comparing at least some of the frequency-based domain size measurement data to a predetermined limit to characterize the surface of the feature.

At least some embodiments of the invention may include a method for characterizing surfaces that includes measuring a diameter of a feature of a manufactured product over time, and using the diameter measurements to yield a first data set consisting of time-based domain diameter measurement data. The time-based domain diameter measurement data may be transformed to frequency-based domain diameter measurement data to yield a second data set consisting of frequency-based domain diameter measurement data, and a subset of data from the second data set may be compared to a predetermined limit to characterize the surface of the feature.

At least some embodiments of the invention may include a system for characterizing surfaces that includes a control system having at least one controller and configured to receive information related to size measurements of a feature of a manufactured product taken over time, which may yield size measurement data in a time-based domain. The controls system may further be configured to transform the time-based domain size measurement data to frequency-based domain size measurement data, and compare at least some of the frequency-based domain size measurement data to a predetermined limit to characterize the surface of the feature.

BRIEF DESCRIPTION OF THE DRAWINGS

FIGS. 4A and 4B respectively show raw data and transformed data for a polished steel pin journal of a crankshaft such as the crankshaft shown in FIG. 1;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
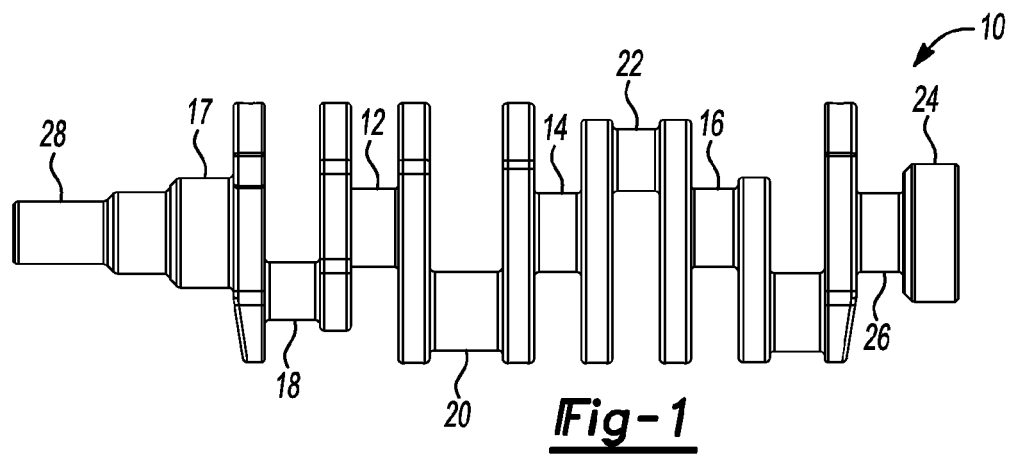
FIG. 1 shows a crankshaft as an example of the manufactured product to which embodiments of the present invention may be applied.

FIG. 1 shows a crankshaft 10 as an example of a manufactured product to which a system and method of the present invention may be applied. The crankshaft 10 includes a number of cylindrical features, including: main journals 12, 14, 16, 17; pin journals 18, 20, 22; an oil seal 24; a thrust wall 26; and a post 28. During production manufacturing, one or more of these cylindrical features may be measured to ensure that its diameter is within acceptable manufacturing tolerances. Embodiments of the present invention can use the diameter measurements for more than just size information, the measured data can be used as a means to characterize the surfaces of the features. It should be noted that although diameter measurements are typically used in examples provided herein, embodiments of the invention are not so limited, and other size measurements—e.g., thickness, width, length, etc.—may be the subject of surface characterization as described herein.

Figure 2:
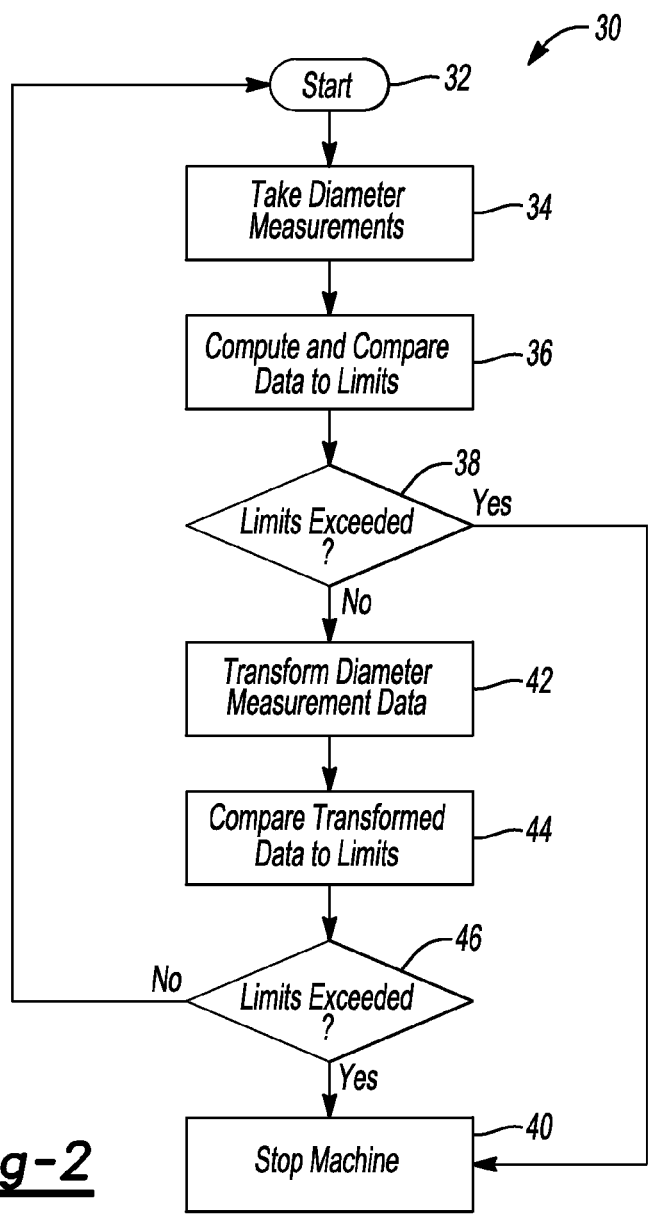
FIG. 2 shows a flowchart illustrating the basic steps of an embodiment of a method in accordance with the present invention.

FIG. 2 shows a flowchart 30 illustrating the basic steps of a method in accordance with an embodiment of the present invention. Each of the steps is introduced here, and is described in more detail below. The process starts at step 32, and at step 34 size measurements, in this case measurements for diameter evaluation, are taken over time for a given feature of a manufactured product—e.g., the main journal 12 of the crankshaft 10 shown in FIG. 1 as it rotates. The size measurements taken—i.e., the raw data—may be a direct measurement of the size feature such as diameter, or as explained in more detail below, may be a measurement of variation in size from a nominal value; this is discussed below with reference to a linear variable differential transformer (LVDT) being used to measure diameter. The size measurements are then used to yield a first set of data consisting of size measurement data—in this case diameter measurement data—in a time-based domain. In some embodiments, the size measurement data may be used directly—i.e., the size measurement data is the raw data actually measured. In other embodiments, the raw data may be further processed, for example by filtering out certain of the raw data, so that the size measurement data is not the raw measurement data, but rather, is a set of filtered data created by using the raw data.

At step 36, several parameters are computed. The computed values are compared to limits—e.g., the diameter measurement data may be compared to acceptable diameter limits. At step 38, if the limits are exceeded, an action may be taken, such as stopping one or more production machines to determine the cause of the problem, such as shown at step 40. If limits are not exceeded, the data process will continue to step 42. Thus, at least some of embodiments combine a conventional size characterization process with the surface characterization described herein.

At step 42, the size measurement data, which could be diameter measurement data, are transformed, for example, from a time-based domain to a different domain, such as a frequency-based domain. Because frequency and wavelength are directly related, the examples discussed herein which use a transform that yields a frequency-based domain, could use a transform to yield a wavelength-based domain. Similarly, as explained below in regard to wavelength band analysis, frequency can be used instead of wavelength. Thus, for purposes of analyses described herein, frequency and wavelength may be considered equivalents.

The transform from the time-based domain to the frequency-based domain yields a second set of data consisting of frequency-based domain diameter measurement data. The transformed data, which may be, as explained in more detail below, within specific frequency bands is then compared to preset limits at step 44 to determine if the surface of the feature being measured is within acceptable parameters, thereby providing a characterization of the surface under consideration. It is determined at decision block 46 whether the data exceeds the limits, and if not, the method loops back to the start. If, however, it is determined at decision block 46 that the limits are exceeded, an action may be taken, such as stopping one or more production machines to determine the cause of the problem. Therefore, in at least some embodiments, the "characterization" of the surface finish is a determination of whether the surface finish is within acceptable limits. Stated another way, the "characterization" need not provide a direct measurement of the surface finish, but rather, the surface finish may be characterized as acceptable or not acceptable based on the collected size data. This may also be referred to in a manufacturing setting as "pass/fail" or "go/no-go", and can be used to accept or reject parts, and to determine if a larger problem exists, such as a defective machine.

Turning specifically to step 34, the diameter or other size measurements may be taken with any instrument effective to provide the necessary information. In at least some embodiments of the present invention, a system may include an LVDT mounted proximate the feature being measured, for example, the main journal 12 shown in FIG. 1. In such case, the crankshaft 10 is rotated and the LVDT repeatedly measures the journal diameter variations over a set period of time or rotations. As known to those of skill in the art, measuring diameter with an LVDT as described above provides measurements of diametric variation from a set diameter, rather than the actual diameter itself. For example, if a shaft journal is supposed to be manufactured to a nominal diameter of 30 millimeters (mm), a single LVDT may be placed at 15 mm from the center of the shaft. Then, as the shaft is rotated, a displacement of the LVDT probe of 10 micrometers (μm) indicates that the diameter of the shaft at that position is 30 mm plus 10 μm or 30 mm minus 10 μm, depending on the direction of displacement of the LVDT probe.

In at least some embodiments two measuring devices may be used, such as two LVDT's, mounted on opposite sides of the feature being measured. With this setup, two measurements are taken simultaneously at each given instant in time, and the difference may be calculated and used as the diameter measurement. A system in accordance with embodiments of the present invention may also include a control system having one or more controllers, one or more processors, and which is configured to receive signals, process, and/or store data related to the measurements being taken. Moreover, such a controller(s) or processor(s) may implement the methods of the present invention as described below.

Unlike a surface finish gauge, which may have a stylus with a nose radius in the neighborhood of 5 μm, diameter measurements such as described above will usually be taken with a measuring device having a much larger nose radius. LVDT's, such as described above, may have measuring probes with a nose radius in the neighborhood of 15 mm. Although the larger nose radius associated with diameter measuring devices may not provide the detailed surface profile available from a surface finish gauge, embodiments of the present invention can provide a surface characterization based on the diameter data that provides the necessary surface information to indicate whether the finishing machining operations were performed satisfactorily. This can be done without unacceptably increasing inspection and/or production time, and without adding hardware or requiring additional floor space. For example, if a particular polishing operation is performed incorrectly during production, or even missed completely, it may not be necessary to know exactly what the surface roughness of the particular feature is; rather, it may be enough for an operator or inspector to know that the surface finish is significantly rougher than it would be if the polishing process had been performed to specification.

Figures 3A, 3B:
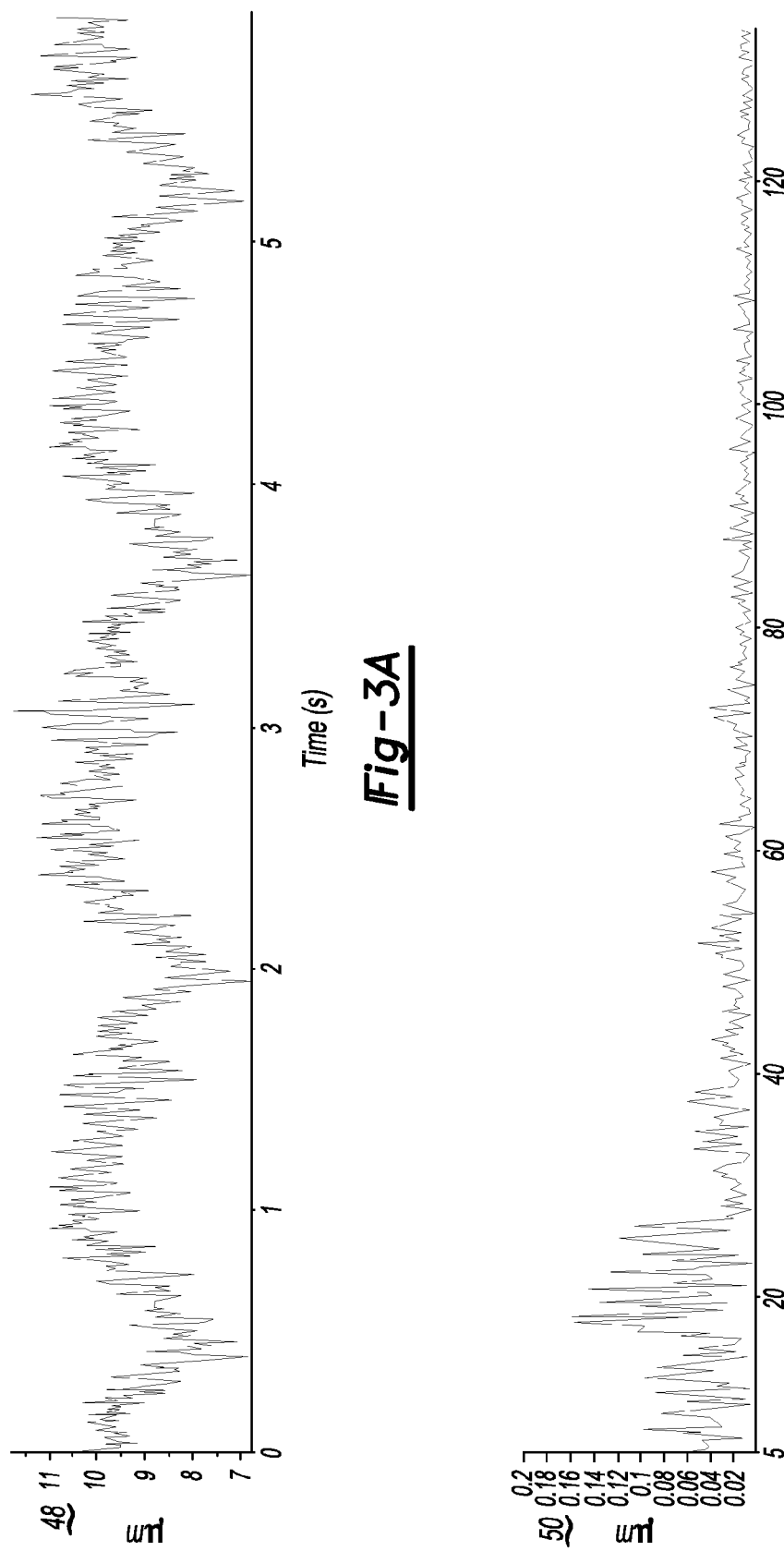
FIGS. 3A and 3B respectively show raw data and transformed data for an unpolished steel pin journal of a crankshaft such as the crankshaft shown in FIG. 1.

In order to use size data, such as the measured diameter data described above, for characterizing the surface of a product, embodiments of the present invention transform the diameter measurement data from the time-based domain in which it was gathered to a frequency-based (or as explained above, wavelength-based) domain. This can be performed using a mathematical algorithm, such as a Fast Fourier transform, or through the application of other types of algorithms or data manipulation techniques—e.g., various filters can be used, such as a Butterworth filter applied to time domain data to produce band pass filtering. FIG. 3A shows a graph 48 of the unfiltered diameter measurements over time for an unpolished pin journal—see for comparison the polished pin journal 18 on the crankshaft 10 shown in FIG. 1. Along the y-axis is the amplitude of the measurements in micrometers. Directly below it in FIG. 3B is a graph 50, showing the frequency-based transformed data, again with the amplitudes in micrometers along the y-axis.

In contrast to the data shown in FIGS. 3A and 3B, the data in FIGS. 4A and 4B was gathered from a polished crankshaft pin journal, such as the pin journal 18 shown in FIG. 1. Again, the raw diameter measurement data is shown in the graph 52 in FIG. 4A, while the frequency-based transformed data is shown in the graph 54 in FIG. 4B. Comparing FIG. 3A to FIG. 4A shows that it is difficult if not impossible to gather any meaningful information from the raw data regarding the surface characteristics of the pin journal. Specifically, merely because the amplitudes of the measurement data in FIG. 3A are greater than the amplitudes of the measurement data shown in FIG. 4A, does not mean that the feature being measured is polished in one instance and not polished in the other. It is much easier to make this determination based on the transformed data shown in FIGS. 3B and 4B, where much better separation is observed—at least for certain frequencies. In addition to making the comparison easier, using the frequency-based domain data allows particular frequency (or because they are related, wavelength) bands to be examined. As discussed in more detail below, this allows data that is irrelevant or indeterminate to be removed from the comparison. For example, it is not known from observation if the differences in data in FIGS. 3A and 4A—which show the raw data in a time-based domain—are because of surface differences, or if a form deviation such as ovality is the cause. The transformed data—see FIGS. 3B and 4B—can remove data associated with certain frequencies or wavelengths to eliminate the effects of form characteristics, such as ovality.

Figure 5A:
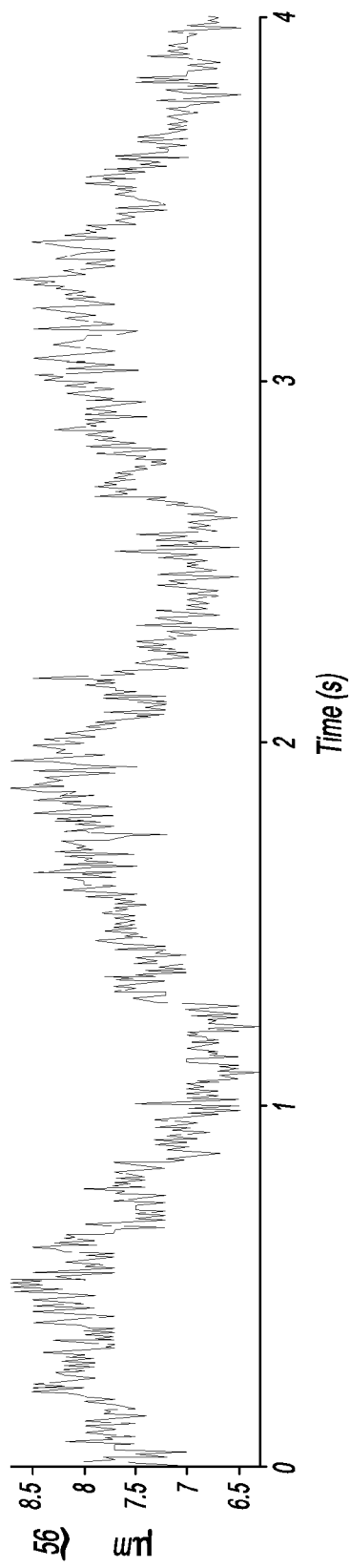
FIGS. 5A and 5B respectively show raw data and transformed data for a cast-iron journal of a crankshaft such as the crankshaft shown in FIG. 1, where the journal has received a Stage II polish, but not a Stage I polish.
Figure 5B:
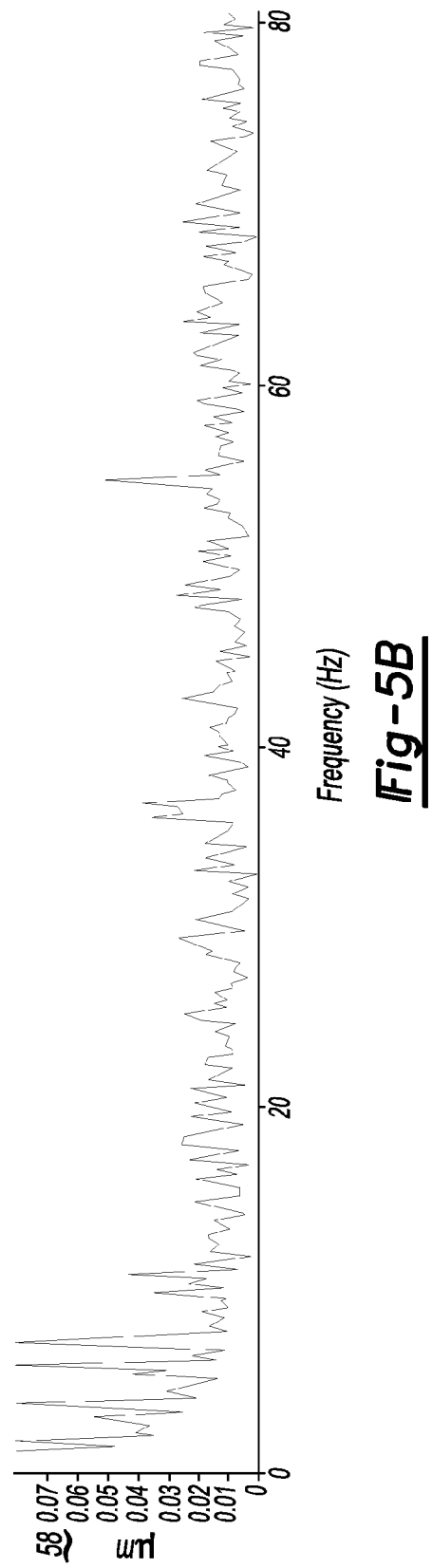
Figure 6A:
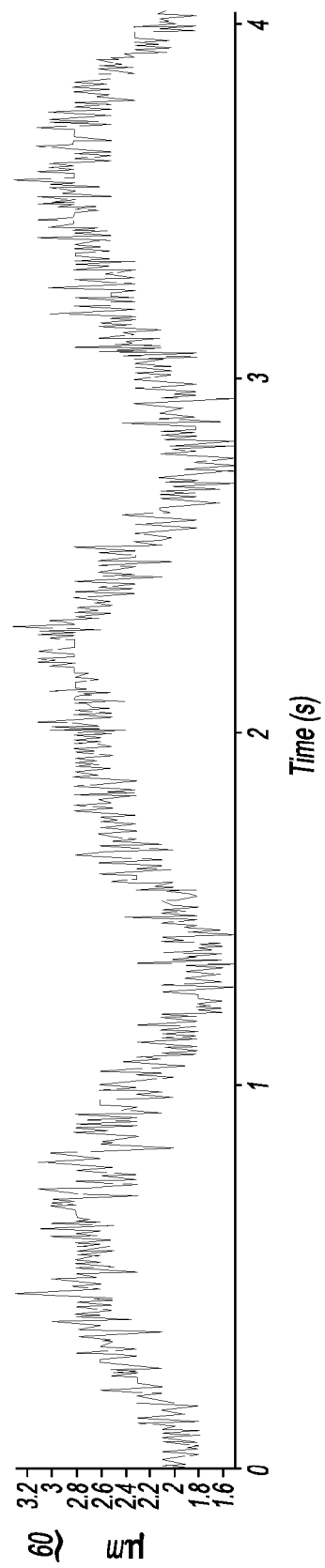
FIGS. 6A and 6B respectively show raw data and transformed data for a cast-iron main journal of a crankshaft such as the crankshaft shown in FIG. 1, where the main journal has received both a Stage I polish and a Stage II polish.
Figure 6B:
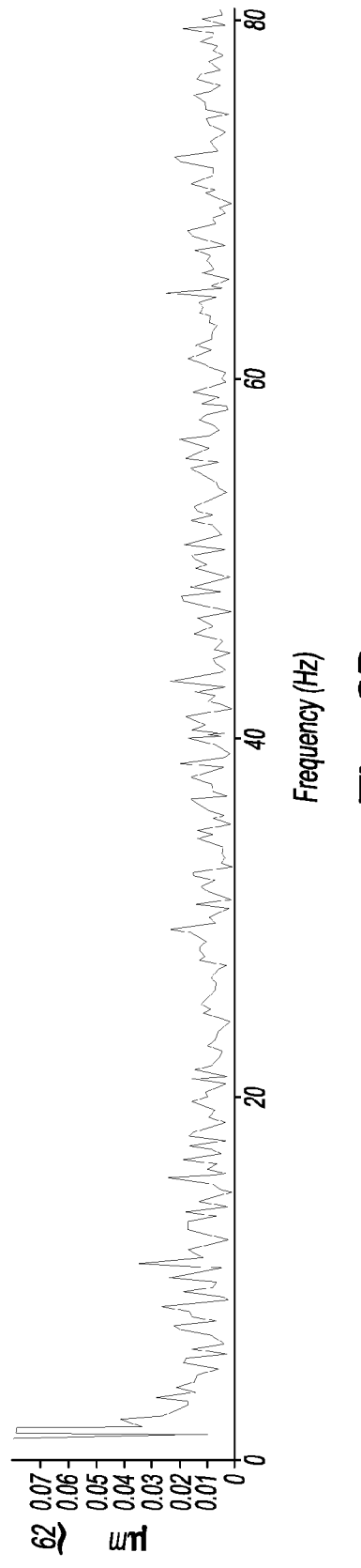

Similar comparisons can be made between the graphs 56 and 60, respectively shown in FIGS. 5A and 6A, and the graphs 58 and 62, respectively shown in FIGS. 5B and 6B. The graph 56 in FIG. 5A shows raw diameter data taken from a cast-iron main journal that was only partially polished. Specifically, the data in FIG. 5A is taken from a cast-iron main journal that had a "Stage II" (finisher stage) polish, but did not receive a "Stage I" (rougher stage) polish. In contrast, FIG. 6A shows raw data from a fully polished cast-iron main journal, such as the main journal 12 shown in FIG. 1. Again, there are differences in the data shown in the graphs 56 and 60, but they are much more readily discerned in the graphs 58 and 62 shown respectively in FIGS. 5B and 6B, where the raw data has been transformed to a frequency-based domain.

One of the advantages of using the frequency-based domain data is that analysis of the data between different graphs, or between the data in one graph and a set of predetermined limits, can be limited to specific, predetermined wavelength (or frequency) bands. The data within a frequency band represents, for example, a subset of data of the second data set described above. Because the relationship between frequency and wavelength is based on known values—values, for example, such as the speed of rotation of the part being measured, the number of measurements recorded per revolution, and the size of the feature being measured—wavelength can be determined from frequency and vice versa. In some embodiments of the present invention, a number of consecutive wavelength bands, five wavelength bands in one example, are set and the data within these bands analyzed.

The wavelength bands do not need to be limited to five, and may be more or less as desired. Moreover, the bands do not need to be of the same width—i.e., they do not need to have the same wavelength range. Upper and lower limits for these bands may be determined based on any of a number of considerations and can be determined, for example, during a "learn mode" described in more detail below. One way to set a lower limit for the wavelength bands is to note that at short wavelengths, which correspond to high frequencies, there is less discernible difference between the transformed diameter data for polished and unpolished parts. This may be, for example, a function of the size of the measuring instrument being used to measure the diameter of the part. For example, with an LVDT having a nose radius of 15 mm it may be known or readily determined that wavelengths below 4 or 5 mm are not readily measurable. This is illustrated in a comparison between FIGS. 5B and 6B where the difference in amplitudes of the transformed measurement data is not very pronounced after about 20 Hz, which compares to a wavelength of approximately 4 mm or shorter.

Setting an upper limit for the wavelength bands can be based on measuring parts having a known, acceptable surface finish. Also, if a shaft is not perfectly round, but possesses some ovality, it would be undesirable for this form factor to adversely affect the accuracy of the surface characterization. By eliminating very long wavelengths, and by analogy very low frequencies, form factors can be removed from the data being analyzed. As shown in FIGS. 3B and 4B the transformed, frequency-based domain data does not approach a zero frequency, but rather, ends at approximately 5 Hz. This helps to ensure that long wavelengths, which might undesirably affect the surface characterization, are eliminated from the analysis. Although the graphs 58, 62 in FIGS. 5B and 6B show the x-axis going to 0 Hz, the wavelength bands can be chosen such that the very low frequency (long wavelength) data is not analyzed.

Once the wavelength bands have been set, the data within them can be compared to predetermined limits. One of the ways the data can be used is to analyze the maximum amplitude within a particular wavelength band, and compare this to the predetermined limits. Another way is to use the sum of all of the amplitudes within a particular wavelength band, and compare this value to the predetermined limits. As described in more detail below, the predetermined limits may be based on measurements taken from fully polished crankshafts that will allow a comparison of data to provide a characterization of the surface of the manufactured product being measured.

Figure 7:
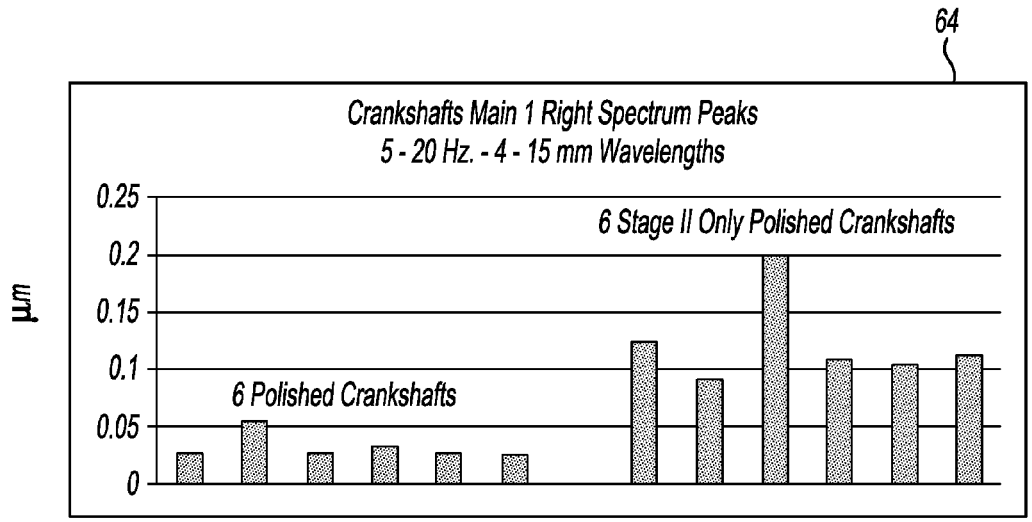
FIG. 7 shows a comparison between peak amplitudes for fully polished and partially polished main journals on crankshafts over a first frequency band.
Figure 8:
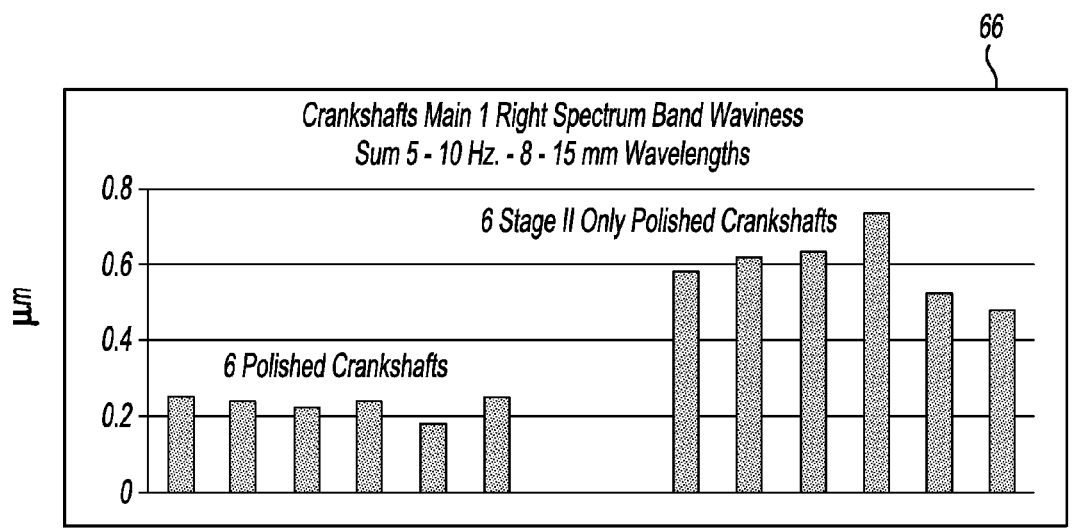
FIG. 8 shows a comparison between the sum of amplitudes for fully polished and partially polished main journals on crankshafts over a second frequency band.
Figure 9:
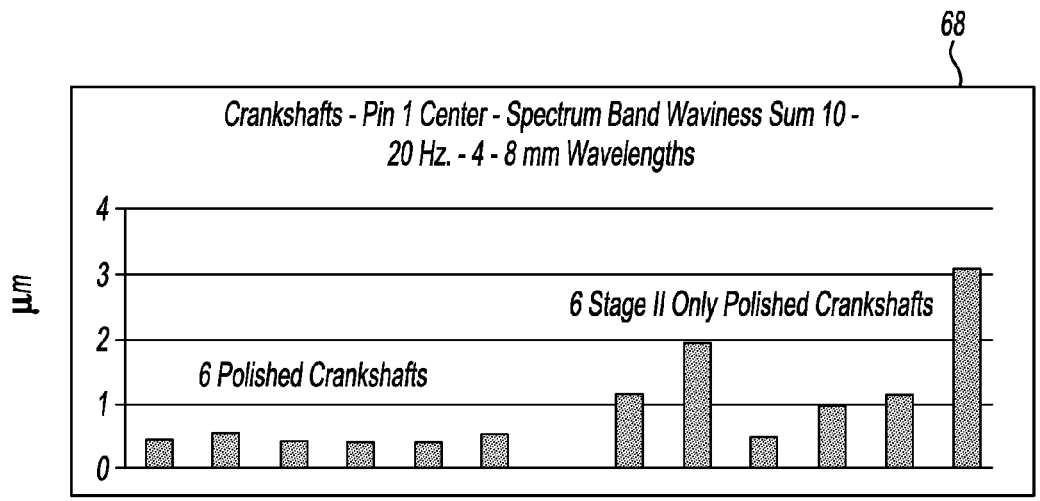
FIG. 9 shows a comparison between the sum of amplitudes for fully polished and partially polished pin journals on crankshafts over a third frequency band.
Figure 10:
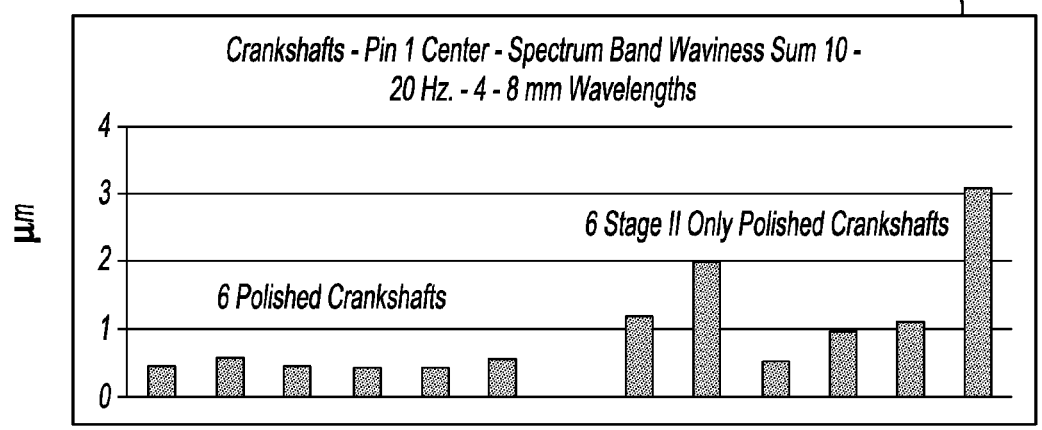
FIG. 10 shows a comparison between the sum of amplitudes for fully polished and partially polished pin journal crankshafts over the third frequency band.

FIG. 7 shows a graph 64 wherein transformed size data taken from the main journal of six polished crankshafts is compared to six crankshafts having only a "Stage II" polish. As noted in the legend in the graph 64, the amplitude values are peak values (as opposed to the sum of various values) from a frequency band of 5-20 Hertz (Hz), which corresponds to a wavelength band of 4-15 mm. Presented in this graphical form, it is clear why the transformed size data provide such a good indication of surface characterization for the product being measured—there is a stark contrast between the fully polished and partially polished crankshafts. Graphs 66, 68, 70, respectively shown in FIGS. 8, 9, 10 illustrate other examples of comparisons between fully polished and partially polished crankshafts over different wavelength bands, and are based on the sum of the amplitudes over these bands.

Figure 11A:
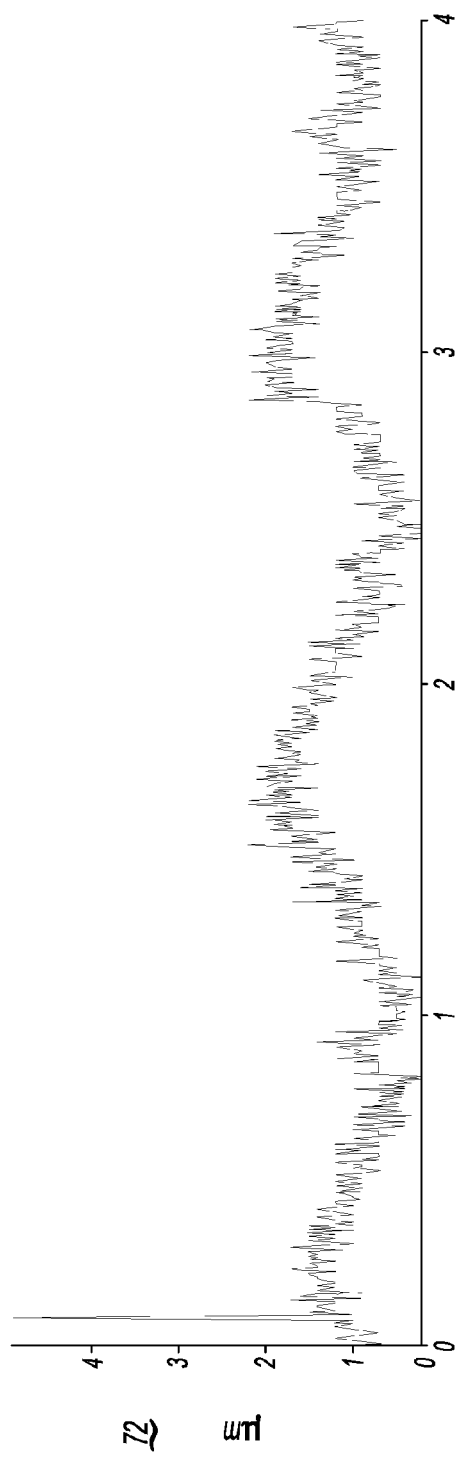
FIGS. 11A and 11B respectively show raw data with and without contamination for a pin journal of a crankshaft such as the crankshaft shown in FIG. 1.
Figure 11B:
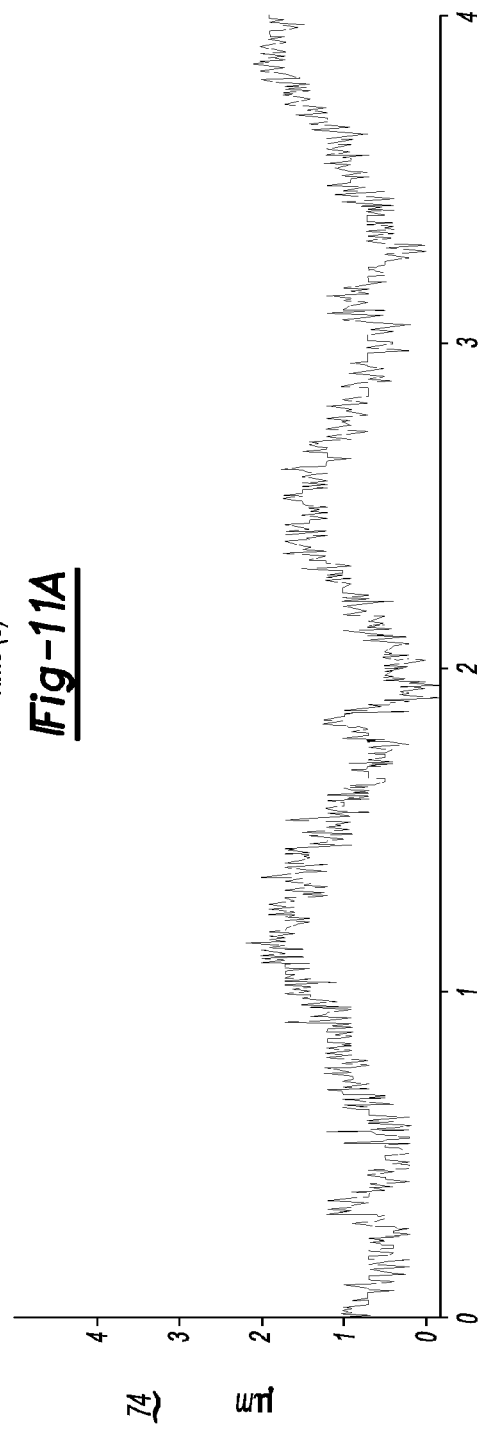

As noted above, embodiments of the present invention contemplate the use of a "learn mode" in order to set the limits for the wavelength bands to be analyzed, as well as to set limits for the amplitude of the data that would indicate an alarm condition. Polished crankshafts that are used for the learn mode are free of contamination and other defects that could provide inaccurate information—e.g., pullout defects and porosity. FIGS. 11 A, 11 B and 12 show why it is important to have contamination and defect free products in the learn mode. Specifically, FIG. 11A shows a graph 72 with a plot of diameter measurement data from a shaft with contamination. There is an extreme amplitude spike around 0.2 seconds; FIG. 11 B shows a graph 74 with a plot of diameter measurement data from the same crankshaft with the contamination removed.

Figure 12:
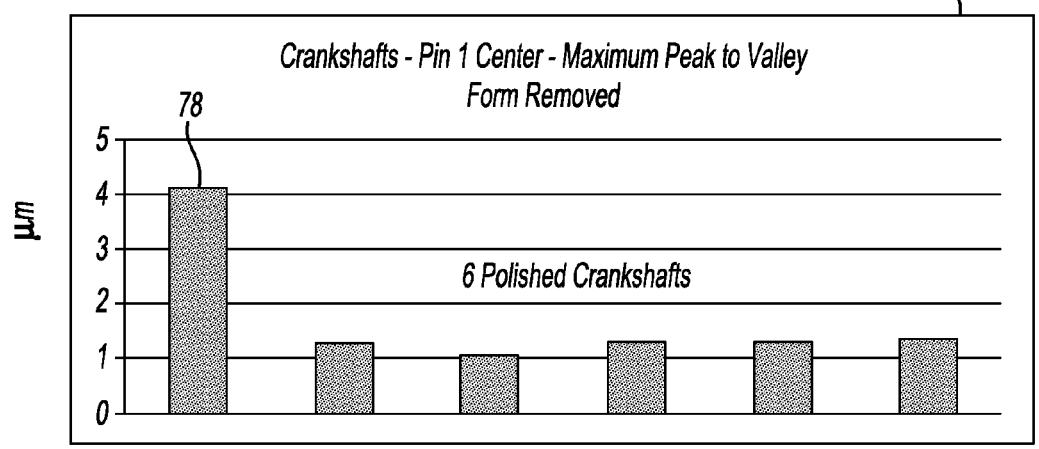
FIG. 12 shows a comparison between the filtered maximum peak to valley amplitudes for pin journals of five repeated crankshaft measurements without contamination and the same pin journal of a crankshaft having contamination in the first measurement.

The data spike shown in FIG. 11A could skew the results of the learn mode and make it more difficult to recognize a surface finish problem in a production part. In particular, the presence of the contamination could cause an artificially high alarm limit to be set. This is illustrated in the graph 76 shown in FIG. 12 where the first bar 78 is based on data measured from a contaminated shaft, whereas the remaining five measurements of the same crankshaft were uncontaminated. Projecting this data upon one of the previous graphs, such as the graph 60 shown in FIG. 9, it is clear that it would be difficult to identify a partially polished crankshaft if the "polished" crankshaft had an amplitude near 4 µm like the data bar 78 shown in graph 76.

In one embodiment, a learn mode may proceed generally as follows. Three fully polished crankshafts may have each of their various features—e.g., main journals, pin journals, etc.—measured for diameter. Thus, features having an acceptable surface finish are measured, thereby yielding a of diameter measurements in a time-based domain—i.e., a time-based domain data set. The size data can then be low pass filtered such that long wavelengths—i.e., wavelengths over a predetermined length—are removed, thereby eliminating the form deviations described above. Next, the minimum amplitude is subtracted from the maximum amplitude for each of the features being measured on the crankshafts; this yields "peak-to-valley" values. The lowest value is selected as the baseline "peak-to-valley" value and with very high probability would be free of contamination.

Additional polished shafts are then measured and after filtering the data from each surface feature being measured, it is compared to the corresponding baseline peak-to-valley value and the complete raw data is accepted if its peak-to-valley value is not outside of some predetermined deviation—e.g., 30% of the baseline value. This process is continued until a predetermined number of parts have been measured, for example, in the embodiment described above it may be 15 crankshafts. Finally, for each feature—i.e., main journals pin journals, etc.—the raw data is transformed to yield a frequency-based domain data set. Next, one or both of the maximum amplitude (peak value) or the sum of the amplitudes is stored for each wavelength band. This data can be characterized as a maximum amplitude data set and a sum-of-sizes data set, which in this embodiment is a sum-of-diameters data set, respectively.

The average values and standard deviations are calculated and an alarm limit set based on some factor of the standard deviations—e.g., a high alarm may be set at three standard deviations from the mean. Once an alarm is indicated, handling of that event may differ depending on the product being manufactured for the feature being examined. In one example, if a comparison between the transformed data within a particular wavelength band exceeds the predetermined limit, thereby setting off an alarm, in any three of six consecutive measurement cycles, a more serious alarm signal may be sent to a controller, such as a gauge main controller. Of course, the learning mode and alarm handling processes described above represents just one example of such systems and methods that are contemplated by the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for characterizing surfaces comprising:
   taking size measurements of a respective feature of a plurality of manufactured products over time;
   transforming the size measurements to frequency-based domain size measurement data;
   comparing at least some of the frequency-based domain size measurement data to a predetermined limit to characterize the surface of the features of the manufactured products; and
   separating at least one of the manufactured products based on the characterized surface finish.

2. The method of claim 1, wherein taking size measurements is performed using at least one of a mechanical, electro-mechanical, or electronic measuring instrument.

3. The method of claim 1, wherein comparing at least some of the frequency-based domain size measurement data to a predetermined limit is performed using only the frequency-based domain size measurement data within a predetermined wavelength band.

4. The method of claim 3, wherein comparing at least some of the frequency-based domain size measurement data to a predetermined limit is performed using only the frequency-based domain size measurement data of maximum amplitude within the predetermined wavelength band.

5. The method of claim 3, wherein comparing at least some of the frequency-based domain size measurement data to a predetermined limit is performed using a sum of all of the frequency-based domain size measurement data within the predetermined wavelength band.

6. The method of claim 1, wherein the predetermined limit is defined by a process including:
   (a) taking size measurements of a feature having an acceptable surface finish of a manufactured product over time to yield a data set of size measurement data in a time-based domain;
   (b) removing from the data set size measurement data corresponding to wavelengths over a predetermined length;
   (c) calculating a peak-to-valley value for the size measurement data in the data set;
   (d) transforming the time-based domain size measurement data in the data set to frequency-based domain size measurement data to yield a frequency-based domain data set;
   repeating (a)-(d) for features of additional manufactured products to yield a plurality of frequency-based domain data sets; and
   defining the predetermined limit based on the frequency-based domain data sets.

7. The method of claim 6, wherein defining the predetermined limit based on the frequency-based domain data sets includes:
   determining the size measurement of maximum amplitude within each of the frequency-based domain data sets to yield a maximum amplitude data set;
   calculating mean and standard deviation for the maximum amplitude data set; and
   defining the predetermined limit as a predetermined number of the standard deviations away from the mean.

8. The method of claim 6, wherein defining the predetermined limit based on the frequency-based domain data sets includes:
   determining a sum of the size measurements for each of the frequency-based domain data sets to yield a sum-of-sizes data set;
   calculating mean and standard deviation for the sum-of-sizes data set; and
   defining the predetermined limit as a predetermined number of the standard deviations away from the mean.

9. A method for characterizing surfaces comprising:
   measuring a diameter of a respective feature of a plurality of products over time;
   transforming the diameter measurement data to frequency-based domain diameter measurement data;
   comparing a subset of the frequency-based domain data for each of the products to a predetermined limit to characterize the surface of the features of the products; and
   separating at least one of the products based on the characterized surface finish.

10. The method of claim 9, wherein the subset of data includes only the frequency-based domain diameter measurement data within a predetermined wavelength band.

11. The method of claim 9, wherein the subset of data includes only the frequency-based domain diameter measurement data of maximum amplitude within a predetermined wavelength band.

12. The method of claim 9, wherein the subset of data includes only a sum of all the frequency-based domain diameter measurement data within a predetermined wavelength band.

13. The method of claim 9, further comprising performing a learning mode process on features of respective manufactured products having an acceptable surface finish to define the predetermined limit.

14. The method of claim 13, wherein the learning mode process includes:
   (a) taking diameter measurements of a feature having an acceptable surface finish of a manufactured product over time to yield a data set of diameter measurement data in a time-based domain;
   (b) removing from the data set diameter measurement data corresponding to wavelengths over a predetermined length;
   (c) calculating a peak-to-valley value for the diameter measurement data in the data set;
   (d) transforming the time-based domain diameter measurement data in the data set to frequency-based domain diameter measurement data to yield a frequency-based domain data set
   repeating (a)-(d) for features of additional manufactured products to yield a plurality of frequency-based domain data sets; and
   defining the predetermined limit based on the frequency-based domain data sets.

15. The method of claim 14, wherein defining the predetermined limit based on the frequency-based domain data sets includes:

determining the diameter measurement data of maximum amplitude within each of the frequency-based domain data sets to yield a maximum amplitude data set;

calculating mean and standard deviation for the maximum amplitude data set; and defining the predetermined limit as a predetermined number of the standard deviations away from the mean.

16. The method of claim 14, wherein defining the predetermined limit based on the frequency-based domain data sets includes:

determining a sum of the diameter measurement data for each of the frequency-based domain data sets to yield a sum-of-diameter measurement data set;

calculating mean and standard deviation for the sum-of-diameter measurement data set; and defining the predetermined limit as a predetermined number of the standard deviations away from the mean.

17. A system for characterizing surfaces, comprising:

a control system having at least one controller and configured to receive information related to size measurements of a feature of a manufactured product taken over time, the control system being further configured to transform the size measurement data to frequency-based domain size measurement data, and compare at least some of the frequency-based domain size measurement data to a predetermined limit to characterize the surface of the feature.

18. The system of claim 17, wherein the control system is further configured to use only the frequency-based domain size measurement data within a predetermined wavelength band to compare to the predetermined limit.

19. The system of claim 18, wherein the control system is further configured to use only the frequency-based domain size measurement data of maximum amplitude within the predetermined wavelength band to compare to the predetermined limit.

20. The system of claim 18, wherein the control system is further configured to use only a sum of all the frequency-based domain size measurement data within the predetermined wavelength band to compare to the predetermined limit.

* * * * *